Feb. 13, 1968   R. A. SANGER   3,369,138

MOTOR END FRAME FASTENING APPARATUS

Filed Aug. 6, 1965

INVENTOR.
ROBERT A. SANGER
BY
Merl E. Sceales
ATTORNEY

United States Patent Office 3,369,138
Patented Feb. 13, 1968

3,369,138
MOTOR END FRAME FASTENING APPARATUS
Robert A. Sanger, Troy, Ohio, assignor to A. O. Smith Corporation, Milwaukee, Wis., a corporation of New York
Filed Aug. 6, 1965, Ser. No. 477,745
12 Claims. (Cl. 310—89)

This invention relates to motor end frame fastening means and particularly to means providing a reliable and rigid releasable interconnection of a motor end frame to a tubular main frame of a submersible motor wherein relatively large thrust forces are encountered.

In submersible pump motors and the like for pumping of water and other fluids, axial thrust forces are developed on the rotating armature as a result of the pumping action. The thrust forces are normally transmitted through suitable thrust bearings to the end frames or caps which are suitably secured to the cylindrical main frame or housing. Although submersible motors have been highly developed, a simple and relatively inexpensive attachment means for the end frames has presented problems.

The present invention is particularly directed to a method and apparatus for firmly attaching motor end frames to the outer cylindrical motor main frame to readily absorb substantial thrust forces.

Generally, in accordance with the present invention, an anchor lug means is secured to the internal face of the main cylindrical frame and projects radially inwardly. Anchor bolts are passed through the end frame with a suitable attachment or securement nut means secured to the inner end thereof to form an end frame subassembly. The securement nut means and the anchor lug means are positioned to permit insertion of the subassembly into the motor after which the nut means are moved beneath the anchor lug means. In a preferred construction, the nut and lug means are interrelated by suitable notch means such that the subassembly is inserted into the end frame with the nut means radially passing the anchor means. The end frame subassembly is rotated to align the nut means with the anchor lug means after which the bo't means are tightened to securely anchor all of the parts into a rigid assembly. All of the rotating thrust is thereafter transmitted to the end frame and through the nut and anchor lug means directly to the frame.

The present invention has been found to provide a reliable and simple method and means to interconnect motor end frames to the main frame and particularly in submersible motors where relatively large thrust forces are required.

The drawing furnished herewith illustrates preferred constructions of the present invention clearly disclosing the above advantages and features as well as others which will be clear from the following description of the drawing.

Figure 1:
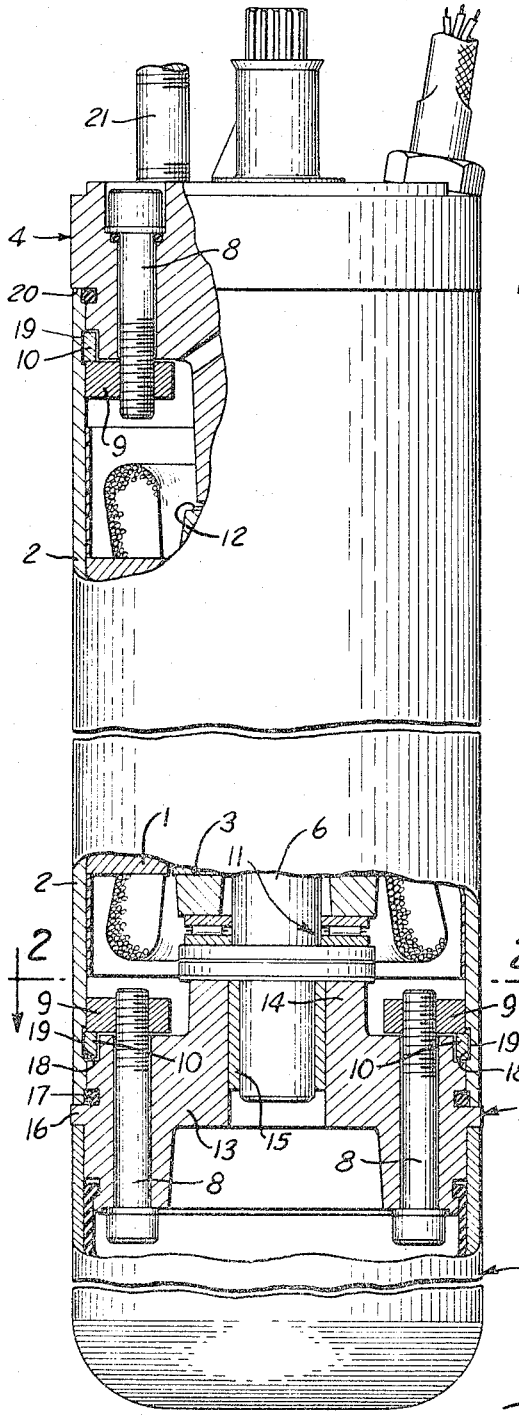
FIG. 1 is a side elevational view of a submersible motor unit with parts broken away to show details of the end frame structure and its attachment to the main frame.

Referring to the drawing and particularly to FIG. 1, the illustrated submersible motor includes an annular stator member 1 centrally located within an outer tubular main shell or frame 2. An armature 3 is rotatably mounted in alignment with the annular stator 1 and rotatably supported to the opposite side of the stator within an upper end frame 4 and a lower end frame 5, respectively. The armature 3 is carried by shaft 6 which projects outwardly through and is journaled in the upper end frame 4 for connection to a pump, not shown. The lower end of shaft 6 is journaled in the lower end frame 5. The illustrated motor is of the oil filled type and includes a flexible bag unit 7 secured to the lower end of the motor beneath end frame 5 to maintain the main frame 2 filled with oil, not shown, generally in accordance with the known operation of a motor of this type. The end frames 4 and 5 are similarly interconnected to the main frame 2 by the improved means of this invention which includes a plurality of attachment bolts 8 which pass through the corresponding end frames 4 and 5 with a square nut 9 on the inner end thereof. Anchor lugs 10 are provided on the inner face of main frame 2 and project inwardly and outwardly of the nuts 9. The bolts 8 are drawn up tightly such that the nuts 9 engage the inner surface or face of the associated anchor lugs to clamp the end frames 4 and 5 to main frame 2. The thrust forces established on the armature 3 as a result of operation are transmitted through suitable upper and lower thrust bearing units 11 and 12 to the respective end frames 4 and 5. The greatest forces are generated on the lower end frame 5 and a suitable rotating thrust bearing unit 11 such as a self aligning axial bearing or any other suitable construction is mounted between the rotor and the end frame. The upwardly directed thrust forces are substantially less and a simple wear ring unit 12 is therefore all that is needed.

More particularly the main frame 2 is generally a relatively thin tubular shell with stator 1 suitably secured centrally thereof.

The lower end frame 5 is a cast member and has an annular portion 13 and a central radial bearing hub 14 projecting inwardly from the portion 13. The hub 14 includes an inner radial bearing 15 within which the corresponding end of the armature shaft 6 is rotatably disposed. The inner face of the hub 14 forms a support for the thrust bearing unit 11. The outer periphery of the end frame includes a small radial flange 16 located centrally thereof which abuts the end face or edge of the main frame with the portion 13 machined to closely slidably fit within the cylindrical end of the main frame. An O-ring seal 17 is interposed in suitable mating recesses between adjacent portions of the main frame and the annular portion of the end frame to create a fluid tight joint therebetween. The outer end of portion 13 defines a support means for the bag unit 7.

Figure 2:
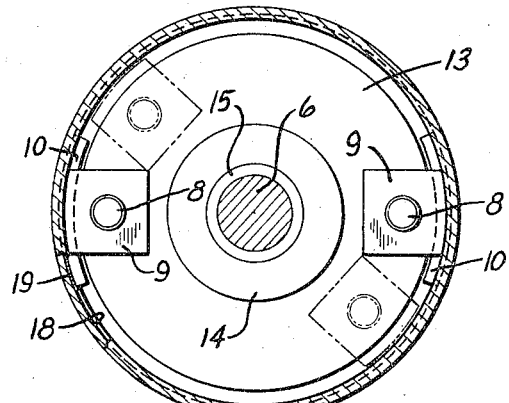
FIG. 2 is a transverse section taken generally on line 2—2 of FIG. 1 and illustrating the movement of the end frame from the initial assembly to the final locking position.

The end frame 5 is fixed to the main frame 2 by the bolts 8 as follows. Spaced axially inwardly from the seal 17 is a circumferential recess 18 on the inner surface of the main frame within which the anchor lugs 10 are secured circumferentially spaced in accordance with the bolts. The anchor lugs 10 are similarly formed as short segments of a ring and project inwardly to define a clamping wall for nuts 9 carried by the bolts 8. Each lug 10 is held within the securement recess or anchor recess in any suitable means. In FIGS. 1 and 2, an adhesive material 19 secures the lugs within the recess. The adhesive need only provide a temporary support as subsequently described. The corresponding attachment nuts 9 are generally provided with a rectangular or square outer periphery, as shown in FIG. 2, and in the final assembly engage the corresponding anchor lug to secure the end frame to the main frame by clamping the flange 16 against the outer edge of the frame 2. The adjacent inner peripheral arm of frame 13 is notched to accommodate the lug 10.

In assembly, the bolts and nuts are assembled with the end frame 5 to form an end frame subassembly. The subassembly is then inserted into the main frame 2 with the subassmebly rotated to angularly space the square nuts 9 with respect to the anchor lugs 10, as shown in phantom in FIG. 2. After the end frame subassembly is completely inserted within the main frame 2 with the square nuts 9 positioned axially inwardly of the innermost surface of anchor lugs 10, the end frame is rotated to bring the square nuts 9 into alignment with the corresponding anchor lugs 10. The bolts 8 are then drawn up and tightened to draw the nuts into engagement with the anchor lugs and thus provide a clamping force acting between the flange 16 and frame 2 at the outer end and between the lugs 10 and nuts 9 at the inner end to securely anchor the subassembly into a rigid assembly with the main frame 2. The nut 9 is shown as a generally square nut such that it cannot rotate or turn about the axis of the bolt 8 when tightening thereof.

The square nuts 9 will engage the adjacent main frame 2 such that turning of the bolts draws the nuts into the desired clamping engagement.

The lugs 10 bind within the recess 18 and as previously noted the adhesive 19 need not provide any permanent holding force, although the use of a permanent holding adhesive might be employed. Further, if desired, clamping wall defined by the lugs 10 may be integrally formed with the frame 2, as a projection or suitable recess into which the nuts 9 are positioned for clamping engagement. Thus, in accordance with the present invention it is only necessary to provide an inner clamping wall which projects from a continuous wall portion of the main frame with the clamping wall constructed to permit insertion of the subassembly and subsequent operative positioning of the nuts.

The upper end frame 4 is generally similarly formed and secured to the main frame 2 by the interengagement of the clamping nuts 9 and spaced anchor lugs 10 on the inner wall of the frame 2. The thrust forces at the upper end are minimal compared to those at the lower end and the simple bearing ring unit 12 is suitable at the upper end. Further, the clamping flange 20 of the upper end frame is shown continuous with the outer periphery of the frame 4 and suitable mounting studs 21 or other means are provided for securement to the pump, not shown.

Figure 3:
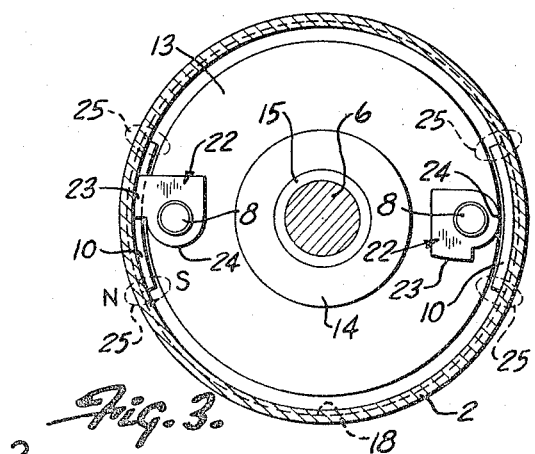
FIG. 3 is a fragmentary transverse section similar to FIG. 2 showing an alternative construction of this invention.
Figure 4:
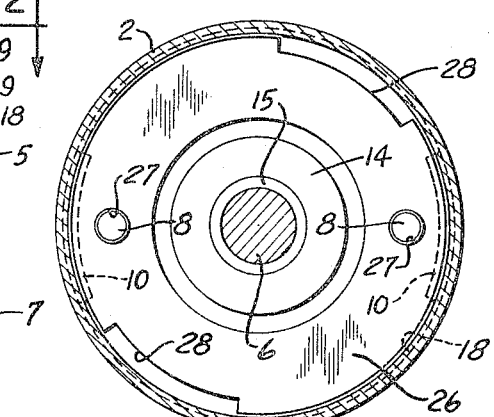
FIG. 4 is a transverse section similar to FIG. 2 showing a further embodiment of this invention.

If desired, other means and arrangements can be provided to permit insertion of an end frame subassembly with the tightening nut means moved to clamping position after insertion; for example, as shown in FIGS. 3 and 4.

Referring particularly to FIG. 3, an alternative is shown to permit insertion of the subassembly with nuts and lugs radially spaced. Corresponding elements in the embodiments are similarly numbered. In FIG. 3, a nut 22 is shaped to be turned under the lug 10 by the initial turning of the associated bolt 8 without rotation of the end frame subassembly. In the illustrated embodiment, the nut 22 is formed with a cam edge defining a clamping edge 23 of maximum radius and a release edge 24 of shorter recess. When the nut 22 is positioned with the release edge 24 aligned or facing main frame 2, the nut is transversely spaced radially inward of the anchor lug or wall 10 such that the subassembly can be inserted into frame 2. When the bolt 8 is turned, the clamping edge 23 moves into engagement with frame 2 and holds the nut 22 such that turning of bolt 8 draws the nut into clamping engagement with anchor wall 10.

In summary, the bolt 8 and nut 22 are assembled with the end frame 5 to define a subassembly with the edge 24 of the nut 22 aligned with and positioned therefor to pass the anchor lug 10 during the insertion of the subassembly, as shown in phantom for the one unit in FIG. 3. When the associated bolt 8 is initially rotated, counterclockwise as viewed in FIG. 3, the nut 22 correspondingly rotates with it until the clamping edge 23 binds against the main frame 2 which prevents further rotation of the nut such that the bolt 8 can be drawn up to tightly clamp the end frame to the main frame.

Further as diagrammatically shown, the anchor lugs 10 are transversely magnetized, as shown by flux lines 25 and attracted to frame 2 for initial assembly.

A further alternative construction is shown in FIG. 4. In this embodiment, the several nuts are formed as a continuous ring 26 encircling the hub 14 of the end frame 5. Ring 26 includes a plurality of tapped openings 27, one for each of the anchor bolts 8. The outer periphery of the ring 26 is notched as at 28 to pass the corresponding anchor lugs 10 during the insertion of the subassembly of the end frame, bolts and ring into the main motor frame 2. After insertion, the subassembly is rotated to align a continuous ring portion with the anchor lugs 10 and thereby provide a similar interconnection upon the drawing up of the anchor bolts 8. Obviously, if the individual nuts are employed as heretofore described, an anchor ring might be employed with suitable notches for insertion of the subassembly.

Thus, the present invention employs cooperating anchor wall means on the inner surface of the main frame and axially movable clamping means forming a part of the end frame subassembly constructed to permit relative initial movement therebetween to permit movement into an operative locking position after insertion of the subassembly and completely exteriorly of the motor assembly.

The present invention thus provides a very simple and reliable means for interconnecting of end frames to the main frame in a submersible or other motors wherein relatively heavy thrust loads may be imposed on the thrust bearings or the like.

Various modes of carrying out the invention are contemplated as being within the scope of the following claims particularly pointing out and distinctly claiming the subject matter which is regarded as the invention.

I claim:

1. A motor having a tubular main frame and an end frame secured to the end of the main frame, the improvement in the attachment means therefor comprising,
   an end frame subassembly including the end frame and a plurality of bolt means having a first clamping wall means adjustably secured to the inner end thereof and axially movable in response to rotation of the bolt means, and
   second clamping wall means forming a part of the tubular main frame and positioned axially outwardly of the first clamping wall means of the end frame subassembly,
   said first clamping wall means of the end frame subassembly and the second clamping wall means of the main frame being transversely aligned in one position of the subassembly and being transversely misaligned in a second position of the subassembly whereby said end frame subassembly may be assembled with the main frame and the first clamping wall means of the subassembly subsequently transversely aligned from the second clamping wall means of the main frame.

2. The motor of claim 1 wherein said first and second clamping wall means are defined by a plurality of correspondingly circumferentially spaced members which are axially movable relative to each other with the end frame subassembly rotated to circumferentially locate the wall means of the end frame subassembly between adjacent wall means of the main frame.

3. The motor of claim 1 wherein said second clamping wall means includes a separate transverse wall positioned within a recess on the inner wall of the main frame, and an adhesive material interposed between the transverse wall and the main frame to rigidly attach the wall to the main frame.

4. The motor of claim 1 wherein said second clamping wall means includes a separate transverse wall positioned within a recess on the interior of the main frame, said transverse wall being at least partially transversely magnetized and held within the recess by magnetic attraction to the main frame.

5. A motor having a tubular main frame and an end frame secured to the end of the main frame, the improvement in the attachment means comprising,
an outer clamping wall on said end frame,
a generally radial projecting anchor wall means on the surface of the main frame spaced inwardly from the outer end of the main frame, said outer end of the main frame constituting a second clamping surface,
a bolt means projecting through an opening in the end frame and axially inwardly of said anchor wall means,
a nut means threaded on the inner end of the bolt means, and
means operative exteriorly of the main frame and the end frame for moving the bolt means and thereby said nut means to alternatively move the nut means in clamping alignment with the main frame anchor wall means out of alignment whereby said end frame with the bolt means and nut means thereon is insertable and removable as a subassembly from said main frame.

6. A motor having a tubular main frame and an end frame secured to the end of the main frame, the improvement in the attachment means comprising,
an outer clamping wall on said end frame,
a generally radial projecting anchor wall means on the surface of the main frame spaced inwardly from the outer end of the main frame, said outer end of the main frame constituting a second clamping surface,
a plurality of bolt means each projecting through a separate opening in the end frame and extending inwardly of said anchor wall means, said bolt means being equally radially spaced within the main frame, and
a plurality of similar nuts secured at least one to each of the bolt means, each of said nuts having an outer perimeter with one portion spaced from the axis of the bolt means less than the spacing between the anchor wall means and the bolt means and a second portion spaced from the main frame in excess of the spacing between the bolt means and the anchor wall means, whereby rotation of the bolt means causes the nuts to be locked in position to the inner side of the projecting anchor wall means.

7. The motor of claim 5 wherein said nut means are formed as individual nuts with a generally rectangular perimeter and are located immediately adjacent the main frame to prevent rotation thereof.

8. The motor of claim 5 wherein said nut means are formed as individual nuts one for each bolt means and with an eccentric perimeter and are selectively rotated about the axes of the bolt means whereby the short radius faces the adjacent main frame to transversely space the nut from the anchor wall and the long radius faces the adjacent main frame to dispose the nut beneath the anchor wall and in engagement with the main frame to prevent complete rotation of the nut means.

9. The motor of claim 5 wherein said anchor wall means includes a plurality of circumferentially spaced anchor walls and said nut means is a ring having a plurality of circumferentially spaced notches in the outer edge for selective alignment and misalignment with the several anchor walls by rotation of the end frame.

10. A submersible motor, comprising
a tubular main frame having an outer open end,
an end frame having a plurality of circumferentially spaced bolt openings and an outer flange for clamping engagement with the outer open end of the main frame,
a plurality of bolts, one in each of the bolt openings,
a plurality of clamping nuts threadably secured one each to the inner end of each bolt, and
a plurality of axially aligned and circumferentially spaced anchor walls mounted in a circumferential recess in the inner surface of the main frame and projecting radially inwardly therefrom, said recess restricting outward movement of the clamping walls to provide for clamping engagement between the clamping nuts and the anchor walls.

11. A submersible motor having an annular stator and a rotor rotatably mounted therein, comprising
a tubular main frame for supporting the stator and projecting axially therefrom, said main frame having a pair of circumferential axially-spaced recesses on the inner surface, one recess being spaced inwardly from each of the ends of the frame,
anchor lugs secured within each of said recesses on the main frame and extending radially inwardly of the main frame,
end frames having an annular portion and being slidably mounted one each in the opposite ends of the main frame and each having a central bearing hub portion projecting inwardly, each of said annular portions having an outer flange bearing on the adjacent end of the main frame and having axial bolt openings and recess means formed on inner corners thereof to mate with the corresponding anchor lugs, and
attachment bolts disposed within the bolt openings and having generally rectangular nuts threaded on the inner end, said bolt means being of a length to dispose the nut inwardly of the anchor lugs and adjacent the main frame whereby the nuts are prevented from turning within the main frame and said bolts may be turned to draw the nuts into clamping engagement with the anchor lugs to securely fix the end frames with the outer flange abutting the main frame.

12. A submersible motor having an annular stator and a rotor rotatably mounted therein, comprising
a tubular main frame for supporting the stator and projecting axially therefrom, said main frame having circumferential recesses on the inner surface inwardly of the opposite ends,
anchor lug means secured within said recess on the main frame and extending radially inwardly of the main frame,
opposite end frames each having an annular portion slidably mounted in the corresponding end of the main frame and each having central bearing hub portions projecting inwardly, said annular portions each having a clamping flange engaging the outer end of the main frame and axial bolt openings and recess means formed on the inner peripheral edge to mate with the anchor lug means, and
attachment bolt means mounted in the axial openings and having outer head means and inner nut means threadedly mounted thereon to form an end frame subassembly, said bolt means being of a length to dispose the nut means inwardly of the anchor means and transversely spaced from the lug means in one position of the subassembly and being aligned with the lug means in a second position of the subassembly whereby the nut means and the lug means are selectively positioned out of alignment for insertion and removal of the end frame subassembly and in alignment for clamping a subassembly to the main frame by tightening of the bolts.

References Cited

UNITED STATES PATENTS 1,411,442  4/1922  Leece _____ 310—89

MILTON O. HIRSHFIELD, *Primary Examiner.*

L. L. SMITH, *Assistant Examiner.*